United States Patent [19]

Chachere

[11] 4,022,675
[45] May 10, 1977

[54] FILTERING PROCESS

[75] Inventor: Joseph D. Chachere, Houston, Tex.

[73] Assignee: Gulf Research & Development Company, Pittsburgh, Pa.

[22] Filed: Aug. 1, 1975

[21] Appl. No.: 601,024

[52] U.S. Cl. .................................. 204/188; 208/113
[51] Int. Cl.² ..................... B03C 5/00; C10G 11/00
[58] Field of Search ............ 208/113; 204/186–191

[56] References Cited

UNITED STATES PATENTS

| | | | |
|---|---|---|---|
| 3,799,855 | 3/1974 | Franse | 204/188 |
| 3,799,856 | 3/1974 | Franse | 204/188 |
| 3,928,158 | 12/1975 | Fritsche | 204/188 |

Primary Examiner—T. M. Tufariello

[57] ABSTRACT

A process for separating finely divided, electrically conductive materials from hot liquid hydrocarbon feed stock for a fixed bed catalytic process such as hydrodesulfurization of gas oils or heavier petroleum fractions or hydrocracking. The feed stock is made to flow longitudinally between electrodes and through a bed of spherical glass particles. A voltage gradient of 5 to 25 kv per inch is applied to the electrodes. Periodically the filter is cleaned by backflushing with filtered product. The backflush liquid and entrained solids are delivered into a fluidized unit to dispose of the solids removed in the backflush liquid. In a specific embodiment, the backflush liquid and entrained solids are delivered into a fluidized catalytic cracking unit.

7 Claims, 2 Drawing Figures

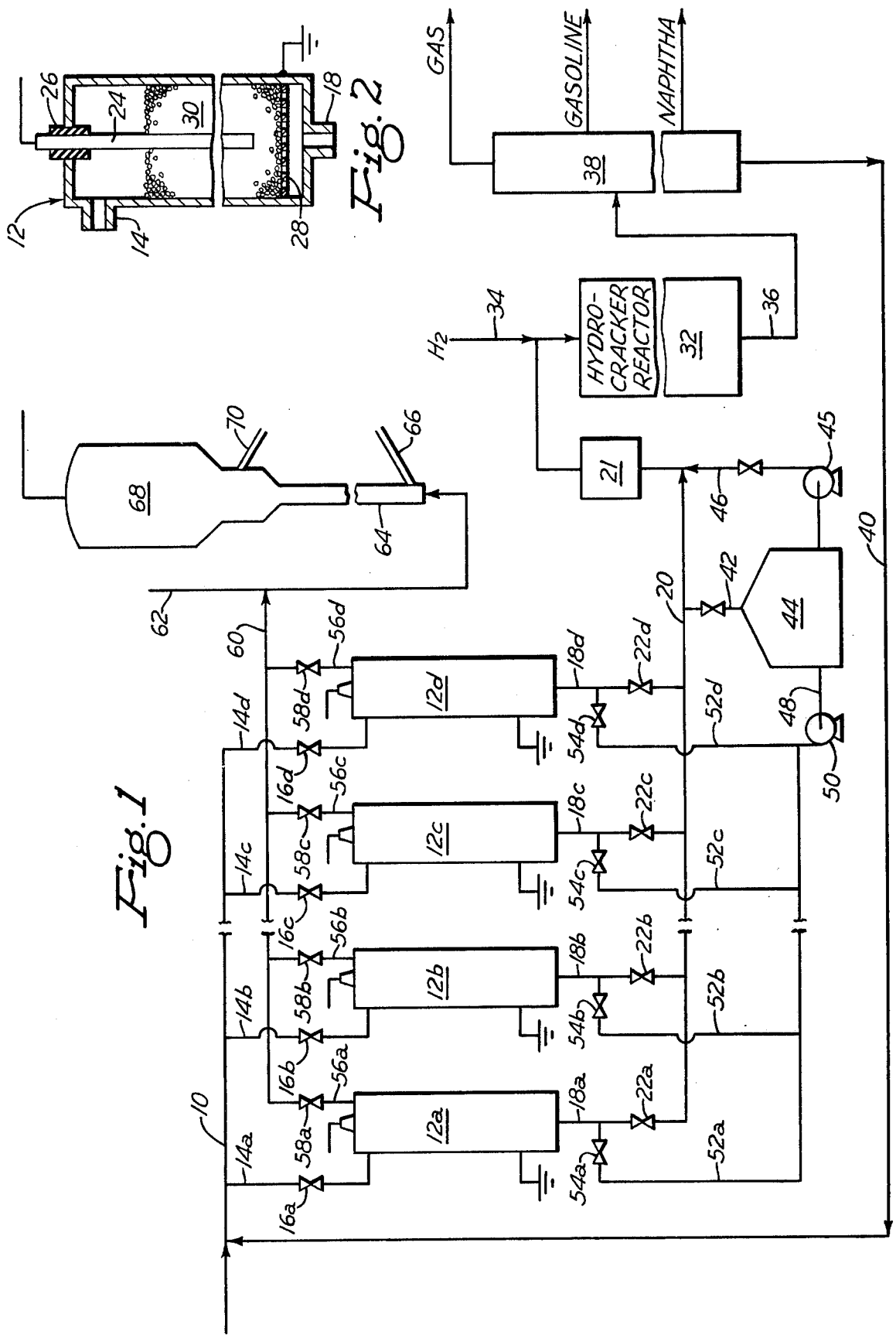

FILTERING PROCESS

BACKGROUND OF THE INVENTION

This invention relates to the refining of petroleum and more particularly to the removal of finely divided solid particles from liquid hydrocarbon fractions to condition them for treatment in processes utilizing a fixed bed of catalyst.

In the refining of petroleum, an initial step is to distill the petroleum to separate the oil into a number of fractions by virtue of the difference in their boiling points. Some of the fractions from the distillations are further processed by passing them through fixed beds of catalysts under conditions of temperature and pressure, and frequently in the presence of hydrogen, to convert the petroleum fractions to products of higher quality. For example, virgin naphthas separated from crude oil by distillation may be passed through a pretreater containing a fixed bed of catalyst to remove sulfur and nitrogen compounds and then through a reformer. Kerosene and residual oil from the distillation may be subjected to hydrodesulfurization by passing through a fixed bed of catalyst to produce jet fuels or fuel oils of higher quality. Gas oil from the distillation may be passed through a catalytic cracking unit in which part of the gas oil is converted to gasoline and more volatile hydrocarbon fractions and a light gas oil. The catalytically cracked light gas oil may then be hydrocracked by passing it through a fixed bed of hydrocracking catalyst at elevated temperatures and pressures in the presence of hydrogen.

Solid particles in the petroleum fractions delivered to a fixed catalyst bed can plug the bed and necessitate shutting down the process utilizing the fixed catalyst bed for replacement of at least a part of the catalyst before the catalyst is spent. The loss of production as well as the direct labor and catalyst replacement costs make the more frequent catalyst replacement very costly. The solid particles may in some instances, and particularly in reduced crudes, be solid particles that were in the crude oil charged to the distillation unit; however, a large part of the solid particles in distillate products from the atmospheric distillation are electrically conductive materials such as iron oxide or iron sulfide particles picked up from the processing vessels. The concentration of solid particles in the hydrocarbon fractions is low and the size of the particles is extremely small. In some hydrocarbon fractions, for example the charge stock to a hydrocracker, 98 percent of the particles have a diameter less than 5 microns and a major part of the particles have a diameter less than one micron. Such particles do not settle from the hydrocarbon liquids. Filtration of the liquid by passing liquid through a permeable medium is not effective. If the openings in the filter medium are small enough to trap the solid particles, the filter medium quickly becomes plugged. Moreover, most of the liquid hydrocarbon streams in a refinery are hot, and the conventinal filter media, such as paper or urethane foam, are not capable of withstanding the high temperature.

DESCRIPTION OF THE PRIOR ART

In U.S. Pat. No. 3,928,158 of G. Ray Fritsche and Leonard W. Haniak, an electrofilter capable of separating a large part of the particles having a submicron size from hot hydrocarbon liquid streams is described and claimed. The electrofilter consists of a vessel having an electrode extending longitudinally through it spaced from the wall of the vessel. The wall of the vessel is ordinarily grounded and serves as an electrode. The space between the electrode and the wall contains glass spheres. A high voltage of the order of 10 kv per inch of distance between the electrode and the vessel wall is applied to the filter and liquid caused to flow through the permeable bed formed by the glass spheres. The solid particles, even electrically conductive particles such as iron sulfide, are deposited on the spheres.

The spherical particles in the filter are essential to the separation of the very small solid particles in the hydocarbon stream. An electric precipitator in which the space between the electrodes is open is not effective in separating the solids. It is important that the spherical particles have a smooth surface that is substantially devoid of pores or indentations to allow substantially complete removal of deposited solids by backflushing to thereby return the spherical particles to a condition in which they are effective in precipitating solids. Particles of river gravel are effective in removing solid contaminants from liquid hydrocarbons during the first cycle that the river gravel is used, but the river gravel can not be cleaned adequately by ordinary backflushing to allow its use in subsequent cycles.

While the electrofilter is effective in removing a large part of the solid particles and thereby greatly reducing plugging of the catalyst bed to which the filtered liquid is delivered, the amount of solids that can be separated in the filter before it is reconditioned is small. It is necessary, therefore, to clean the filter at frequent intervals. Cleaning is accomplished by passing a liquid upwardly through the filter at a rate adequate to expand the bed and cause movement of the spherical particles while the electrical power supply to the filter is cut off. The solids deposited on the glass spheres are removed from the filter with the backflush liquid. Apparently, the precipitation of the solid particles in the electrofilter causes some agglomeration of those particles becuase the solids will settle, although very slowly, from the backflush liquid. The slow settling rates make large settling tanks necessary if the precipitated solids are separated from the backflush liquid by settling. Then there is still a problem of disposing of the settled sludge. backflushing of an electrofilter is described in U.S. Pat. No. 3,799,857 of A. D. Franse. It is suggested in that patent that the solids that settle from the backflush liquid be passed through a recovery system for producing dry solids capable of being landfilled. In U.S. Pat. No. 3,799,855 of Franse, a similar backflushing procedure is described and it is there suggested that the separated solids can be dried to form a waster solid which could be buried in a landfill.

SUMMARY OF THE INVENTION

This invention resides in a process for separating finely divided solid particles from hot hydrocarbon fractions to condition those fractions for delivery to a fixed bed of catalyst in which the problem of handling a sludge of the solid particles separated in the filter is eliminated. In this invention, solids are separated from the hydrocarbon fractions in an electrofilter having a filter bed of substantially spherical particles of a material of high electrical resistivity, such as glass, and the solids removed from the filter by backflushing with a nonconducting liquid. The backflushing liquid discharged from the filter is delivered into the charge stock for a fluidized process, such as a fluidized catalytic cracking unit or a fluidized coking process.

BRIEF DESCRIPTION OF THE DRAWINGS

FIG. 1 is a diagrammatic flow sheet of one embodiment of this invention in which a light gas oil for charging to a hydrocracker is treated in an electrofilter to remove solid particles therefrom, and the solid particles backflushed from the electrofilter are delivered to a fluidized catalytic cracking unit.

FIG. 2 is a diagrammatic vertical sectional view of an electrofilter of the tyupe used to separate solid particles from hot hydrocarbon fractions to condition them for delivery to a fixed catalyst bed.

DESCRIPTION OF PREFERRED EMBODIMENT

For purposes of illustration, this invention is described for the treatment in an electrofilter of the feed stock to a hydrocracker, and the delivery of the backflush liquid into a fluidized catalytic cracking process, but this invention is not limited to use in that particular combination of refinery processes. The initial electrofiltering step is useful in the treatment of any electrically nonconducting liquid to remove very finely divided solid particles therefrom. The process is particularly valuable in treating such liquids before they are delivered to a reactor containing a fixed bed of catalyst that might become plugged by the finely divided particles being deposited on the catalyst. Examples of other processes in the refining of petroleum in which this invention is useful are the treatment of the charge stock to a reformer or to a gas oil hydrodesulfurization unit. The fluidized unit to which the backflush liquid is discharged can be a fluidized coking process, for example, or other fluidized process in which there is a continuous removal of solid particles either in the form of catalyst or other fines or as product.

Referring to FIG. 1 of the drawings, a feedstock which may be, for example, a virgin, thermally cracked, or catalytically cracked light or heavy gas oil, or a mixture of such gas oils, is delivered into an inlet header 10. Usually the feedstock will be delivered from a processing unit and will be at an elevated temperature in the range of 250° F. to 400° F. The feedstock may be delivered from a pretreater designed to remove sulfur and nitrogen from the feedstock. A plurality of electrofilters 12a, 12b, 12c and 12d are connected in parallel to the inlet header 10 by inlet lines 14a, 14b, 14c and 14d. While four electrofilters 12 are shown, there may be any number of electrofilters connected in parallel, and the number will depend upon the rate of charging feedstock to the hydrocracker and the capacity of the electrofilters used. Inlet lines 14 are connected into the upper ends of the electrofilters 12. An inlet valve 16 is connected in each of the inlet lines between the header 10 and the filters 12. The inlet valve for each of the particular filters is designated by a letter corresponding to the letter for the inlet line and the filter. Filtered product outlet lines, designated by reference numerals 18a, 18b, 18c and 18d extend from the lower ends of the filters 12 and are connected into a filtered liquid line 20. Outlet valves 22a, 22b, 22c and 22d are provided in the outlet lines.

Referring to FIG. 2 in which the electrofilter 12 is shown diagrammatically in vertical section, an electrode 24 extends through an insulating bushing 26 in the top of the filter. The upper end of electrode 24 is connected to a suitable power source for applying a high voltage, preferably a DC voltage, to the electrode. In the embodiment illustrated, the shell of the filter 12 serves as an electrode and is grounded. The voltage applied to electrode 24 is adapted to cause a voltage gradient preferably in the range of 5–20 kv/inch between the electrodes. Within the filter 12 and supported on a perforated plate 28 is a filter bed 30 of glass spheres. The glass spheres preferably have a size in the range of 1/32 to ¼ inch in diameter. The glass spheres have a smooth outer surface, are nondeformable and have an electrical resistivity that is preferably higher than the resistivity of the hydrocarbon liquid that is to be filtered. The upper surface of the bed 30 of glass spheres is a substantial distance below the upper end of filter 12 to permit expansion of the filter bed during backwashing, as hereinafter described. The filter is described in detail and claimed in U.S. Pat. No. 3,928,158.

Referring again to FIG. 1, filtered liquid line 20 is connected to the upper end of a hydrocracker reactor 32. A hydrogen line 34 is shown opening into line 20 to supply hydrogen required for the hydrocracker operation. Furnaces, heat exchangers, pumps, storage tanks, and other incidental equipment indicated generally by box 21 are provided between the electrofilters 12 and hydrocracker reactor 32, as required for adjustment and maintenance of the optimum hydrocracking conditions in the hydrocracker reactor. They have been omitted from the drawings because they do not affect this invention.

Hydrocracker reactor 32 contains a fixed bed of catalyst through which the filtered liquid is passed downwardly. The hydrocracked product is discharged from the lower end of reactor 32 through a line 36 and delivered into a distillation tower 38 in which the hydrocracked product is separated into a plurality of fractions such as gas, gasoline and naphtha. A hydrocracker recycle stream is taken from the bottom of distillation tower 38 and returned through line 40 to feed header 10 for filtering before recycling through the hydrocracker reactor. The recycle stream contains a high concentration of solid particles which would seriously increase the plugging of the reactor catalyst bed if not removed from the system.

All or any part of the filtered product may be delivered through line 20 and a bypass line 42 into a filtered oil storage tank 44. Oil from storage tank 44 can be delivered by a pump 45 through a feed line 46 and lines 20 and 34 into the hydrocracker 32. Filtered product for backflushing the filters can be delivered through line 48 and pump 50 into backflush liquid lines 52a, 52b, 52c and 52d. The backflush liquid lines are provided with valves 54a, 54b, 54c and 54d. Opening from the upper ends of the electrofilters 12 are backflush outlet lines 56a, 56b, 56c and 56d. The backflush outlet lines are equipped with valves 58a, 58b, 58c and 58d. Each of backflush outlet lines 56 is connected into a backflush outlet header 60 for the delivery of backflush liquid and entrained solids to a fluidized catalytic cracking unit. In the drawings, the backflush header 60 opens into the feed line 62 of a fluidized catalytic cracking unit for the delivery of backflush liquid into the lower end of a riser reactor 64. Regenerated catalyst from the regenerator, not shown, of the fluidized catalytic cracking unit is delivered into the lower end of the riser through a catalyst return line 66. At the upper end of riser 64 is a disengagement chamber 68. Catalyst is delivered from the disengagement chamber 68 to the regenerator through a spent catalyst line 70. While the backflush outlet header 60 is shown in the drawing to be connected into the riser 64, header 60 can be connected to deliver the backflush liquid into the regenerator of the fluidized cracking unit.

In the operation of the apparatus shown in FIG. 1 of the drawings, feed stock for the hydrocracker reactor is delivered into header 10 and from the header through lines 14 into the electrofilters 12 while a voltage is applied to the electrodes of the filter to establish a voltage gradient in the range of 5–20 kv/inch between the electrode and the shell of the filter. The hydrocracker feed stock is delivered to the filter 12 at a rate producing a superficial velocity in the range of 0.05 to 0.5 ft./sec. A typical feed stock may have a solids content of 2–8 milligrams per gallon. Filtered product is discharged through outlet line 18a and open valve 22a into line 20. Since the time required for backflushing the filters is only a small fraction of the time the filters are onstream in the filtering operation, ordinarily only a single filter will be backflushed at any one time. In a typical operation of an electrofilter on the feed stock for a hydrocracker, the filters remain onstream for 4–8 hours between backflushing. The need for backflushing the filter is indicated by an increase in the electric current flowing through the filter. Backflushing is continued for a period that may range from one to as much as five minutes. Two minutes is usually adequate. The flow rate during backflushing is designed to cause a superficial velocity in the range of 0.05 to 0.6 ft. per second. It is desirable that the backflushing rate be adequate to expand the bed and cause some rolling of the particles but not to fluidize the filter bed.

Backflushing of a filter is initiated when the electrical current through the filter becomes excessive or when a filter has operated for a predetermined time since it was last backflushed. In a preferred method of operation during which filter 12a, for example, is backflushed, the electrical current is shut off that filter, and valves 16a and 54a are closed. The other filters continue to operate normally. Valve 22a remains open and valve 58a is opened. Filtered product discharged from filters 12b, 12c and 12d flows into line 20 and from line 20 through outlet line 18a into the lower end of filter 12a. Since all of the filters operate at the same temperature, no adjustment of the backflushing liquid is required. Upward flow of filtered product through filter 12a expands and agitates the bed of glass spheres to remove precipitated solids from the glass spheres. Those solids are carried with the backflush liquid through backflush outlet line 56a and header 60 into feed line 62 of the fluidized cracking unit. The concentration of solids in the backflush liquid is normally in the range of 1% to 10% by weight. The precipitated solids are delivered into the lower end of riser reactor 64 and flow upwardly suspended in the hydrocarbon feed with catalyst from line 66 into the disengagement chamber 68. Solids that are deposited on the catalyst particles in riser reactor 64 are delivered through spent catalyst line 70 into the regenerator. Solids from the filter not precipitated on the catalyst particles are handled in the manner of catalyst fines carried from the riser reactor 64 into the disengagement chamber 68. Those solids from the filter carried into the regenerator are oxidized in the catalyst regenerator and removed from the system with the catalyst lost from the fluidized catalytic cracking process. Although the quantity of solids in the hydrocracker feed are large enough to plug the inlet end of the fixed catalyst bed during the long runs through the hydrocracker reactor, the amount of solids is actually quite small, on the order of one pound per thousand barrels of oil, and causes no problem in the fluidized catalytic cracking unit because of continuous removal of solids from the unit.

Backflushing is continued for a period adequate to remove the deposited solids from the glass sphere in the electric filter. Ordinarily backflushing for a period of 1 to 3 minutes is adequate. Thereafter, valve 58a is closed, valve 16a is opened, and the high voltage differential applied to the electrodes to return filter 12a to the filtering operation. The backflushing procedure is performed successively on the other filters as the current flow through the filters indicates that backflushing is needed.

In the event it is desired to backflush filter 12a with filtered product from tank 44 rather than filtered product from line 20, valves 16a and 22a are closed and valves 54a and 58a are opened. The power is shut off from the electrodes and pump 50 is then started to circulate filtered product through the filter 12a. While filtered product is a preferred backflushing liquid, other liquids can be used as long as they are electrically nonconducting. Fresh feed stock can be used for backflushing and is advantageous because it is available at the filter temperature.

This invention provides a method of separating very small particles, which may be electrically conductive, from hydrocarbon liquids and disposing of the particles without requiring special equipment. Although such particles are usually present in very low concentrations, such concentrations are adequate to cause serious plugging of fixed catalyst beds such as are used in many refinery processes. The low concentrations however permit disposal of the solids in fluidized processes without objectionable contamination of the catalyst because of the continuous removal of catalyst, such as in fines, from fluidized systems. Such fines are dry solids separated from gases or vapors and are easily disposed of as compared to sludges in which the backflushed solids are concentrated in and wet with backflush liquid. If the fluidized system into which the backflush liquid is charged is one such as fluidized coking in which solids are removed from the system as a product, the backflushed solids may be disposed of in the product.

I claim:

1. A method of removing finely divided solids from liquid hydrocarbon feed stock for a process utilizing a fixed bed of catalyst comprising passing the feed stock through an electrofilter containing a permeable bed of ceramic spheres while applying a voltage differential of 5 to 20 kilovolts per inch across the bed whereby finely divided solids suspended in the liquid hydrocarbon are deposited on the spheres, periodically decharging the electrofilter, backflushing the permeable bed by flowing a nonconductive backflush liquid compatible with the liquid hydrocarbon feed stock upwardly through the permeable bed at a rate adapted to expand the permeable bed and remove solids deposited on the spheres while the electrofilter is decharged, delivering backflush liquid and entrained solids discharged from the electrofilter during backflushing into a petroleum refinery fluidized process for the treatment of petroleum hydrocarbons, delivering filtered liquid discharged from the electrofilter while the electrofilter is electrically charged to the fixed bed of catalyst, removing with solid particles removed from the fluidized process solid particles delivered with the backflush liquid to the fluidized process, and repeating the cycle of alternately filtering the hydrocarbon feed stock and backflushing the permeable bed.

2. A method as set forth in claim 1 in which the liquid and solid particles discharged from the electrofilter during backflushing are delivered into the reactor of a fluidized catalytic cracking process.

3. A method as set forth in claim 1 in which the liquid flowed upwardly through the permeable bed during backflushing is filtered product discharged from the electrofilter during the filtration cycle.

4. A method as set forth in claim 1 wherein a plurality of electrofilters are operated in parallel; the filtered product discharged from the plurality of electrofilters during the filtration phase of the cycle is discharged into a common filtered product line, periodically one of the electrofilters is decharged, the flow of feed stock into the decharged electrofilter is stopped and filtered product from the common filtered product line is caused to flow upwardly through the decharged electrofilter to backflush solids therefrom, and successively conducting the steps of alternately filtering through and backflushing the electrofilter with each of the electrofilters.

5. A method as set forth in claim 4 in which the feed stock is passed downwardly through the electrofilters at a superficial velocity of 0.05 to 0.5 foot per second for a period of 4 to 8 hours during the filtration phase and the filtered product is passed upwardly through the filter during backflushing at a superficial velocity in the range of 0.05 to 0.6 foot per second for a period of 1 to 5 minutes.

6. A method as set forth in claim 2 in which the hydrocarbon feed stock is for a hydrocracker and contains 2–8 milligrams of solid particles having a nominal diameter less than 5 microns per gallon of feed stock, and the filtered liquid is passed through a fixed bed of hydrocracking catalyst in the presence of hydrogen.

7. A method as set forth in claim 1 characterized by the refinery fluidized process being a fluidized coking process.

* * * * *